(12) United States Patent
Vasilyev et al.

(10) Patent No.: US 10,216,063 B2
(45) Date of Patent: Feb. 26, 2019

(54) SINGLE PASS LASER AMPLIFIER WITH PULSED PUMPING

(71) Applicant: IPG PHOTONICS CORPORATION, Oxford, MA (US)

(72) Inventors: Sergey Vasilyev, Birmingham, AL (US); Igor Moskalev, Birmingham, AL (US); Michael Mirov, Birmingham, AL (US); Valentin Gapontsev, Worcester, MA (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 0 days.

(21) Appl. No.: 15/565,626

(22) PCT Filed: Sep. 30, 2016

(86) PCT No.: PCT/US2016/054747
§ 371 (c)(1),
(2) Date: Oct. 10, 2017

(87) PCT Pub. No.: WO2017/062275
PCT Pub. Date: Apr. 13, 2017

(65) Prior Publication Data
US 2018/0113372 A1    Apr. 26, 2018

Related U.S. Application Data

(60) Provisional application No. 62/395,668, filed on Sep. 16, 2016, provisional application No. 62/237,821, filed on Oct. 6, 2015.

(51) Int. Cl.
*G02F 1/35* (2006.01)
*G02F 1/37* (2006.01)
(Continued)

(52) U.S. Cl.
CPC .............. *G02F 1/37* (2013.01); *G02F 1/3551* (2013.01); *G02F 1/39* (2013.01); *H01S 3/0092* (2013.01);
(Continued)

(58) Field of Classification Search
CPC ................................................ G02F 2001/3528
See application file for complete search history.

(56) References Cited

U.S. PATENT DOCUMENTS

| 7,420,994 B2 * | 9/2008 | Korolev | ................. H01S 3/302 |
| | | | 372/3 |
| 2009/0129413 A1 * | 5/2009 | Richter | .................... G03H 1/02 |
| | | | 372/10 |

(Continued)

FOREIGN PATENT DOCUMENTS

| WO | WO 2015047788 A1 * | 4/2015 | ........... H01S 3/0612 |
| WO | WO 2017062181 A1 * | 4/2017 | ............. H01S 3/108 |

OTHER PUBLICATIONS

A. Thai, M. Baudisch, M. Hemmer, H. Ishizuki, T. Taira and J. Biegert, "250 MW peak power ultrafast mid-IR OPCPA," 2013 Conference on Lasers & Electro-Optics Europe & International Quantum Electronics Conference CLEO Europe/IQEC, Munich, 2013, pp. 1-1.*

P. Lu and Q. Li, "Effects of a minute femtosecond pulse seed on continuous wave pumped supercontinuum generation," 2017 16th International Conference on Optical Communications and Networks (ICOCN), Wuzhen, 2017, pp. 1-2.*

(Continued)

*Primary Examiner* — Rhonda S Peace
(74) *Attorney, Agent, or Firm* — Yuri B. Kateshov, Esq.; Timothy J. King, Esq.

(57) ABSTRACT

Systems and methods for spectrally broadening seed pulses with a single pass laser amplifier are disclosed. A bulk TM:II-VI polycrystalline material with combined gain and nonlinear characteristic provides passive (cold) spectral broadening of high power seed pulses. Continuous pumping provides more significant spectral broadening. In particular, pulsed pumping of TM:II-VI polycrystalline material (e.g.

(Continued)

Cr2+:ZnS, Cr2+:ZnSe, and Cr2+:CdSe) is shown to provide significant spectral broadening to the super continuum generation SCG level. Pulse picking, pump sources, master oscillators and various optical components are described.

29 Claims, 10 Drawing Sheets

(51) Int. Cl.
    *G02F 1/39*     (2006.01)
    *H01S 3/11*     (2006.01)
    *H01S 3/16*     (2006.01)
    *H01S 3/23*     (2006.01)
    *G02F 1/355*     (2006.01)
    *H01S 3/00*     (2006.01)
    *H01S 3/10*     (2006.01)
    *H01S 3/094*     (2006.01)
    *H01S 3/109*     (2006.01)

(52) U.S. Cl.
    CPC .... *H01S 3/094076* (2013.01); *H01S 3/10007* (2013.01); *H01S 3/11* (2013.01); *H01S 3/1608* (2013.01); *H01S 3/1643* (2013.01); *H01S 3/2308* (2013.01); *G02F 2001/3528* (2013.01); *H01S 3/1095* (2013.01); *H01S 3/1623* (2013.01); *H01S 3/1628* (2013.01)

(56) References Cited

U.S. PATENT DOCUMENTS

| | | | |
|---|---|---|---|
| 2010/0246610 A1* | 9/2010 | Mirov | C30B 31/00 372/10 |
| 2011/0069375 A1* | 3/2011 | Lin | G02F 1/39 359/328 |
| 2012/0049092 A1* | 3/2012 | Tu | G02F 1/353 250/504 R |
| 2017/0038660 A1* | 2/2017 | Forget | G02F 1/353 |
| 2017/0235209 A1* | 8/2017 | Beutler | G02F 1/3501 359/328 |

OTHER PUBLICATIONS

S. J. Weber, T. Witting, J. W. G. Tisch and J. P. Marangos, "Single cycle midIR pulse: Spatial, temporal and absolute phase characterisation," 2013 Conference on Lasers & Electro-Optics Europe & International Quantum Electronics Conference CLEO Europe/IQEC, Munich, 2013, pp. 1-1.*

A. Ozawa, W. Schneider, F. Najafi, T. W. Hansch, P. Hommelhoff and T. Udem, "Amplification of ultrashort pulses with a single-pass cryogenic Ti:sapphire amplifier at 80MHz repetition rate," CLEO/Europe—EQEC 2009—European Conference on Lasers and Electro-Optics and the European Quantum Electronics Conference, Munich, 2009, pp. 1-1.*

Gary R. Holtom, Robert A. Crowell, and X. Sunney Xie, "High-repetition-rate femtosecond optical parametric oscillator—amplifier system near 3 μm," J. Opt. Soc. Am. B 12, 1723-1731 (1995).*

\* cited by examiner

SINGLE PASS LASER AMPLIFIER WITH PULSED PUMPING

BACKGROUND OF THE INVENTION

Field of the Invention

The field of the invention is spectrally broadened laser systems. In particular, the invention relates to short pulse mid-IR lasers with supercontinuum output.

Background of the Invention

Pulsed laser sources, which combine ultra-short or femtosecond (fs) pulse duration, high power, and broad optical spectrum are in great demand for a variety of applications in spectroscopy, sensing, coherence tomography, bio-medical, and so on. Extending the spectrally broad laser oscillations to 2-10 µm wavelengths, the so-called mid-IR range, is highly desired for detection of the substances which feature the resonant fingerprints in the mid-IR fingerprint region, e.g. common molecules (including, but not limited to $H_2O$, $CO_2$, CO, and $NH_4$), biomedical materials, air pollutants, hazardous materials. Moreover, high power mid-IR fs sources with broad and coherent optical spectrum are of extreme importance for the time-resolved studies of the fundamental processes in physics and chemistry.

The standard technique for spectral broadening of fs pulses is so-called supercontinuum generation, SCG. In the past decade SCG has been mostly explored in wavelength scale optical fibers and waveguides. SCG covering the whole mid-IR fingerprint region has been demonstrated very recently in a chalcogenide step-index fiber. However, there are intrinsic peak and average power limitations and alignment sensitivity issues with the methods of fiber- or waveguide-based SCG.

More recently, SCG in bulk materials started to show new opportunities with its advantages such as relative simplicity, flexibility, high peak and average power. See for example, M. Durand, et al., "Study of filamentation threshold in zinc selenide," Opt. Express 22, 5852-5858 (2014). In bulk materials laser propagation is not restricted by the material cross section profile, so alignment sensitivity is relaxed. Moreover, SCG in some bulk materials features compression of femtosecond input pulse to even shorter output pulse comprising only few optical cycles, see H. Liang, et al., "Three-octave-spanning supercontinuum generation and sub-two-cycle self-compression of mid-infrared filaments in dielectrics," Opt. Left. 40, 1069-1072 (2015). Both Durant and Liang use an optical parametric amplifier system (OPA) to generate mid-IR.

When a bulk material functions as an optical component, for example transmitting light in a laser system, the bulk material may be referred to as a bulk medium. An important parameter, which defines the ability of the bulk medium to generate a broad continuum, is the so-called critical power for self-focusing, $P_C$. The critical power is a material-specific parameter and is defined by third-order nonlinearity of the material via the nonlinear refractive index $n_2$ where $P_C$ is approximated by $\lambda^2/n_2$. The critical power may vary from hundreds of kW (e.g. in II-VI semiconductors like ZnSe and ZnS) to tens of MW (e.g. in YAG or $CaF_2$).

Typically, peak power levels in excess of the critical power cannot be reached directly from a fs oscillator. Therefore, an amplification stage for fs pulses prior to their delivery to a SCG stage is generally employed. Furthermore, many standard fs oscillators (e. g. Ti:Sapphire, fiber-based) emit in the near-IR. Therefore, a stage for frequency conversion of near-IR fs pulses to mid-IR range (e.g. OPA) is used prior to the SCG stage. On the one hand, the techniques for frequency conversion to the mid-IR range and techniques for amplification of fs pulses are well developed. On the other hand, the overall setup with multiple stages is very complex bulky and high-cost, which greatly limits the practical use of existing mid-IR bulk material SCG sources.

A need exists for a pico-second and even more preferentially a femtosecond laser with broad spectral output that does not rely on multiple stages to produce such output. The present inventors have satisfied that need by constructing a laser system with a single stage that amplifies and spectrally broadens in a single pass configuration. Other non-linear effects, such as pulse compression, may be further provided by this laser system.

BRIEF SUMMARY OF THE INVENTION

The present invention provides short-pulse, broad spectrum generating laser methods and systems that benefit from an optical scheme configured to amplify and spectrally broaden a seed pulse in a single-pass laser amplifier. In the single-pass amplifier, the critical power for self-focusing is exceeded in a nonlinear optical medium and the laser output is spectrally broadened. The nonlinear optical medium has a combination of laser gain and nonlinear properties and the medium is concurrently inadiated with an optical pump pulse and a seed pulse. A pulse picker may be used to select seed pulses for amplification. Spectral broadening may generate a laser supercontinuum.

In at least one embodiment of the present invention, the nonlinear material is a TM:II-VI polycrystalline material such as polycrystalline Cr:ZnS, Cr:ZnSe, Cr:CdS, Fe:ZnSe or Fe:ZnS.

In at least one embodiment of the present invention, the pump laser is an Er— doped fiber laser, a Tm— doped fiber lasers, or a TM:II-VI bulk medium laser.

In at least one embodiment of the present invention, a master oscillator is used to produce seed pulses.

The present invention also provides a method of enhancing the properties of a seed pulse by propagation the seed pulse from a master oscillator into a bulk material he present invention also provides a method of enhancing the properties of a seed pulse by propagation the seed pulse from a master oscillator into a gain medium non-linear bulk material (GM-NM) operable to increasing peak power and broadening the spectrum of the seed pulse and concurrently pumping the bulk medium with an optical pump pulse sufficient to create a laser interaction with the seed pulse and the bulk medium such that a pulse with greater pulse energy and broader spectrum is emitted from the GM-NM.

In at least one embodiment, the present invention provides selectable pumping modes.

BRIEF DESCRIPTION OF THE DRAWINGS

The above and other aspects, features and advantages of the disclosure will become more readily apparent with the aid of the following drawings, in which.

DETAILED DESCRIPTION OF THE INVENTION

Figure 1A:
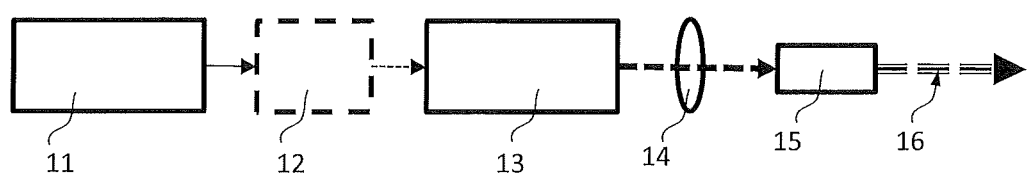
FIG. 1A provides an optical schematic of a mid-IR SCG system.

Reference will now be made in detail to embodiments of the invention. Wherever possible, same or similar reference numerals or letters are used in the drawings and the description to refer to the same or like parts or steps. The drawings are in simplified form and are not to precise scale. For purposes of convenience and clarity only, directional (up/down, etc.) or motional (forward/back, etc.) terms may be used with respect to the drawings. The term "couple" and similar terms do not necessarily denote direct and immediate connections, but also include connections through intermediate elements or devices.

The recent advent of fs oscillators based on transition-metal-doped II-VI semiconductors (TM:II-VI) has allowed one to obtain fs optical pulses directly in the mid-IR spectral range, thus avoiding the need for complex setups for frequency conversion of standard near-IR fs oscillators to mid-IR. Furthermore, very recent progress in polycrystalline $Cr2+:ZnS$ and $Cr2+:ZnSe$ Kerr-lens mode-locked laser technology has resulted in significant improvements in the output parameters of fs mid-IR oscillators for example average power 2 W, pulse energy 24 nJ, and pulse duration ≤29 fs. These four publications: S. Mirov, et al. "Progress in mid-IR lasers based on Cr and Fe doped II-VI chalcogenides", IEEE J. Sel. Topics Quantum Electron., 21(1), 1601719 (2015); I. T. Sorokina and E. Sorokin, "Femtosecond Cr2+-based lasers", IEEE J. Sel. Topics Quantum Electron., 21(1), 1601519 (2015); S. Vasilyev, M. Mirov, and V. Gapontsev, "Mid-IR Kerr-lens mode-locked polycrystalline Cr2+:ZnS laser with 0.5 MW peak power" in Advanced Solid State Lasers, OSA Technical Digest (online) (Optical Society of America, 2015), paper AW4A.3; and S. Vasilyev, I. Moskalev, M. Mirov, S. Mirov, and V. Gapontsev, "Three optical cycle mid-IR Kerr-lens mode-locked polycrystalline Cr2+:ZnS laser" submitted to Opt. Lett. (2015); are incorporated in their entirety by reference.

Figure 1B:
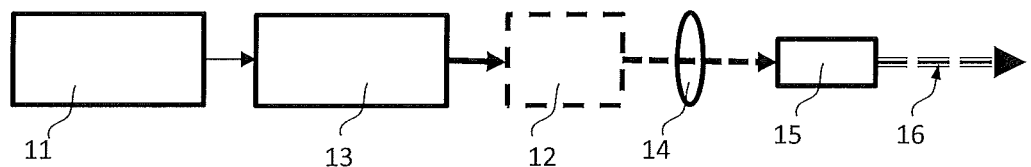
FIG. 1B provides an optical schematic of a mid-IR SCG system.

A generic mid-IR bulk material SCG setup is shown in FIG. 1A. The system consists of a fs master oscillator 11, frequency conversion stage 12, fs laser amplifier 13, focusing optics 14, bulk medium for continuum generation 15. The system is configured to emit a spectrally broad mid-IR continuum 16. The frequency conversion stage 12 is omitted with a suitable mid-IR master oscillator, that is to say when frequency conversion is not needed to generate a mid-IR input for the SCG stage. When used, a frequency conversion stage can be employed between the master oscillator and amplifier as shown in FIG. 1A, or between the amplifier stage and the SCG stage as shown in FIG. 1B.

Figure 2A:
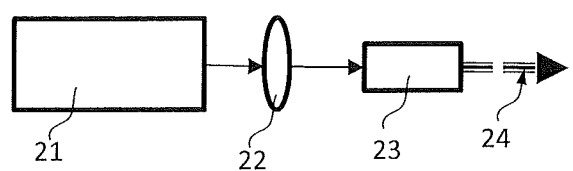
FIG. 2A provides an optical schematic of a master oscillator with a "cold amplifier".
Figure 2B:
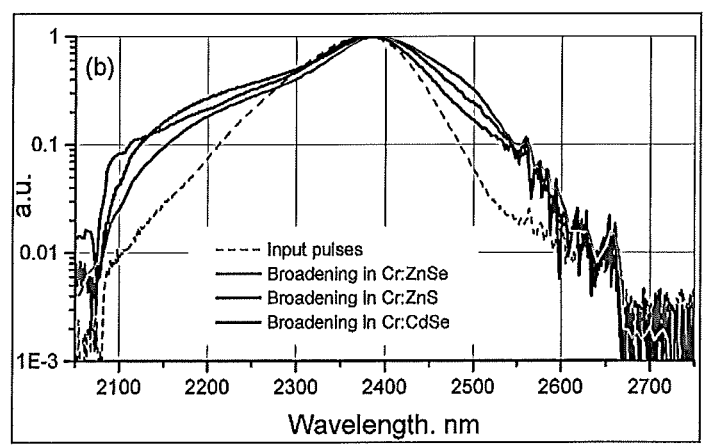
FIG. 2B provides measured spectra of a master oscillator with a "cold amplifier".

FIG. 2A and FIG. 2B, refer to experiments on spectral broadening of a mid-IR fs oscillator in bulk Cr2+:ZnS, Cr2+:ZnSe, and Cr2+:CdSe materials where the bulk medium is not pumped, and as such this considered a "cold amplifier", whereby the only energy imparted into the bulk medium is from the seed pulses. These "cold amplifier" results show that 0.5 MW level of the peak power is high enough to obtain some spectral broadening in polycrystalline Cr2+:ZnS, Cr2+:ZnSe, and Cr2+:CdSe, although it is not sufficient for generation of broad continua. Specifically, FIG. 2A sets forth the optical schematic of the experimental setup: fs master oscillator 21, focusing lens 22, and bulk medium 23. The system is configured to emit a spectrally broad mid-IR continuum 24. FIG. 2B sets forth the measured spectra of the experiment where a mid-IR fs laser was used as the master oscillator seed laser and the bulk material one of the following II-VI materials: Cr2+:ZnS, Cr2+:ZnSe, and Cr2+:CdSe. The measured spectra of pulses is shown on in logarithmic scale with input designated by a dashed lines and output designated by solid lines.

Figure 3:
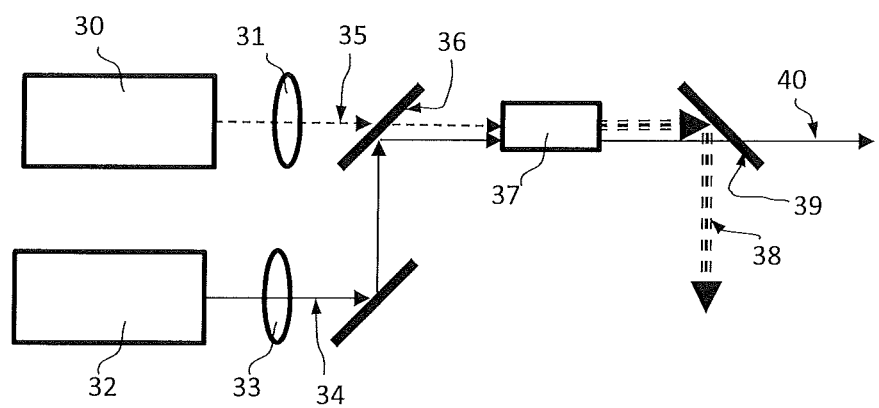
FIG. 3 provides an optical schematic of a master oscillator with a "hot amplifier".

FIG. 3 sets forth an optical schematic of a different experiment where a "hot amplifier" is used. This "hot amplifier" includes a bulk medium that is concurrently optically CW pumped and seeded with a master oscillator pulse. The apparatus of FIG. 3 comprises a mid-IR fs master oscillator (MO) 30 that provides seed laser pulses 35, pump laser 32 that provides CW optical pumping 34, a single bulk material GM-NM 37 which combines both properties of a laser gain medium and a nonlinear medium (e.g. polycrystalline Cr2+:ZnS, Cr2+:ZnSe, and Cr2+:CdSe), focusing optics for MO beam 31, and focusing optics 33 for the pump beam. The pump and MO beams are superimposed with dichroic mirror 36 and focused in the bulk GM-NM. The apparatus includes optional optics for beam steering 34 and for separation of the output beam 38 from the residual pump radiation 40 with dichroic mirror 39.

CW optical pumping of the bulk GM-NM results in amplification of input pulses from MO, nonlinearity of the bulk GM-NM results in spectral broadening of input pulses, and amplification of pulses during their propagation through the bulk GM-NM results in an increase of their peak power and hence, in further spectral broadening. The pump used for this experiment was an Erbium fiber laser sold by IPG Photonics, Oxford, Mass., model number ELR-20-1567-LP.

Figure 4:
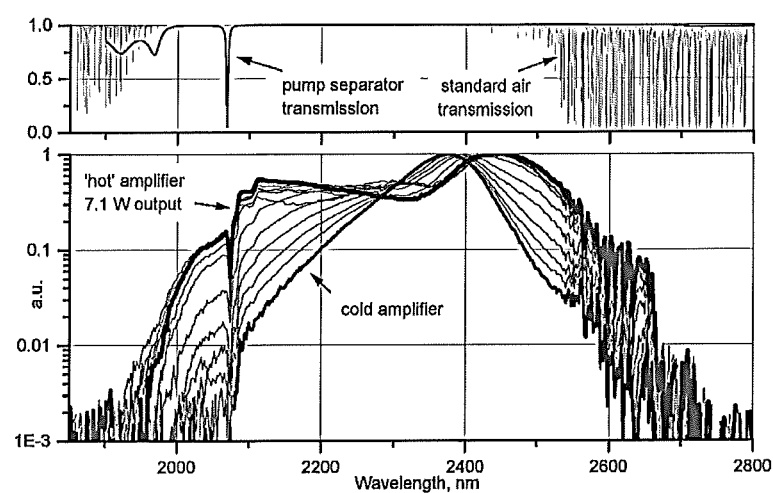
FIG. 4 provides measured spectra of output pulses with a "hot amplifier".
Figure 5:
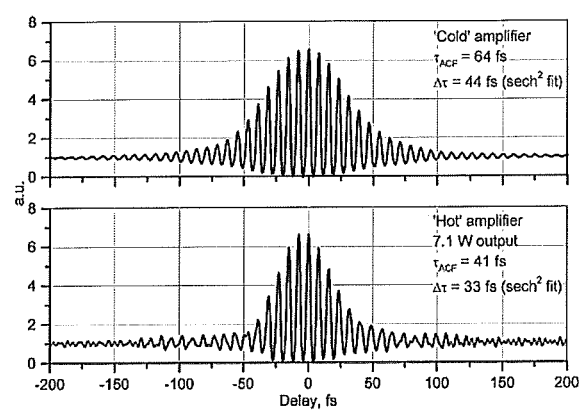
FIG. 5 provides the autocorrelations of output pulses with a "hot amplifier".
Figure 6:
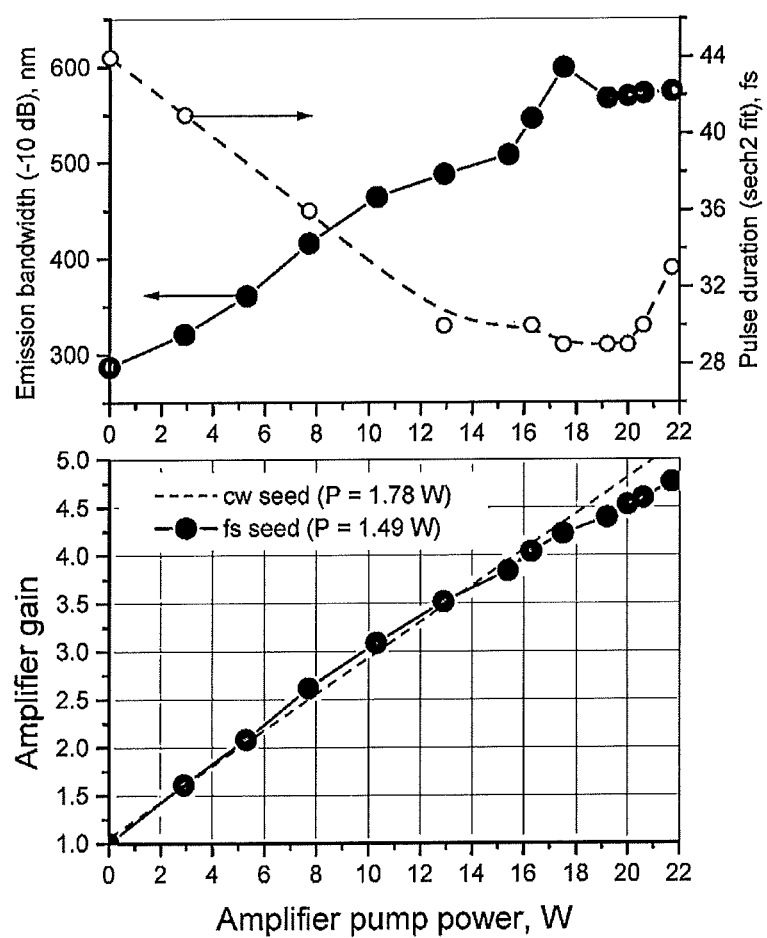
FIG. 6 provides graphs that compare measured characteristics of a "hot amplifier".

Measured experimental results are summarized in FIGS. 4, 5, 6. The experiments were carried out using polycrystalline Cr2+:ZnS as the bulk medium, that is, the GM-NM. Similar results were obtained using polycrystalline Cr2+:ZnSe.

FIG. 4 shows experimental results from the apparatus of FIG. 3 that demonstrate spectral broadening in a hot amplifier. Specifically, comparing the measured spectra of output pulses data labeled "'hot' amplifier" and the data labeled "cold amplifier", increased spectral width is apparent. The 'hot spectrum' was measured at 20 W CW pump power input concurrent with the seed pulses, such that is was a "hot amplifier" and 7.1 W average output power was an increase from the 1.9 W of the seed. The grey lines illustrate spectral broadening with increase of the pump power. Top graph shows transmissions of 1 m standard air and of the pump separator, dichroic mirror 39. As can be seen, the obtained spectrum completely fills 2.0-2.5 μm atmospheric transparency window.

FIG. 5 provides the measured autocorrelations of the experimental output pulses. 'Cold autocorrelation' was measured with the Pump laser turned off and 'hot autocorrelation' was measured at 20 W CW pump power and 7.1 W output power. As can be seen, amplification of input pulses is accompanied by their compression from 44 fs to about 33 fs.

FIG. 6 provides the measured characteristics of the device vs pump power. Top graph compares spectral bandwidth (at −10 dB level) and pulse duration. The bottom graph compares gain of the amplifier. As can be seen, an increase of the pump power results in (i) spectral broadening, (ii) pulse compression, (iii) increase of output power. It is important to note that amplification of fs pulses occurs as efficiently as amplification of CW laser.

Thus, the apparatus of FIG. 3 produces measurable spectral broadening and amplification of fs optical pulses in a CW pumped single pass amplifier. These results show that there was amplification, spectral broadening and compression of mid-IR fs pulses in a single pass through the bulk medium.

In a continuous pumping regime, we amplify the average power P of the master oscillator (i.e. all pulses in the pulse train at ~100 MHz repetition rate are amplified in the same fashion). The average power of the master oscillator (~2 W) is of the same order as the average power of the continuous pump (~20 W). Therefore, the amplifier's gain is relatively low $P_{OUT}/P_{IN}$~5 and the spectral broadening is modest.

Now, in contrast to the modest spectral broadening of the CW pump regime, aspects of the present invention provide more substantial spectral broadening, for example spectral broadening that is SCG capable, that is to say more than one octave. To achieve this level of spectral broadening, we use a pulsed pumping regime.

Figure 7:
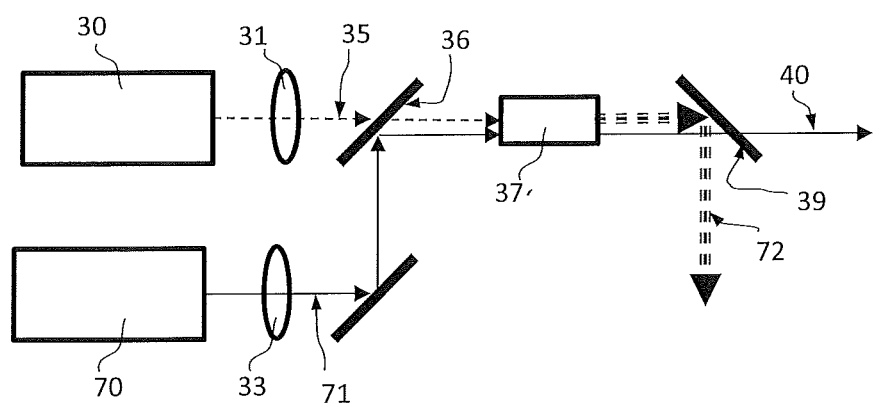
FIG. 7 provides an optical schematic of an embodiment of the invention.

In at least one pulsed pumping regime embodiment, referring to FIG. 7, we amplify the pulse energy E of seed pulses 35 from the pulse train of the master oscillator 35 that coincide with pump pulses 71 from the pulsed pump 70 in the bulk material GM-NM 37 (e.g. Cr2+:ZnS, Cr2+:ZnSe, and Cr2+:CdSe). The energy of the seed pulses, approximately 20 nJ, is 100000 times smaller than the pump pulse energy (2 mJ). Therefore, the amplifier's gain is very high, $E_{OUT}/E_{IN}$ approximately 500, and the spectral broadening in the output 72 is strong.

The nonlinear interaction of input pulses from the master oscillator with said bulk results in non-linear optical effects. These nonlinear optical effects may include any one or any combination of self-focusing, self-phase modulation, cross-phase modulation, four-wave mixing, filamentation and pulse compression. In order to achieve significant spectral broadening the energy of the seed photons s must be significantly smaller than the bandgap energy of the medium.

Figure 8:
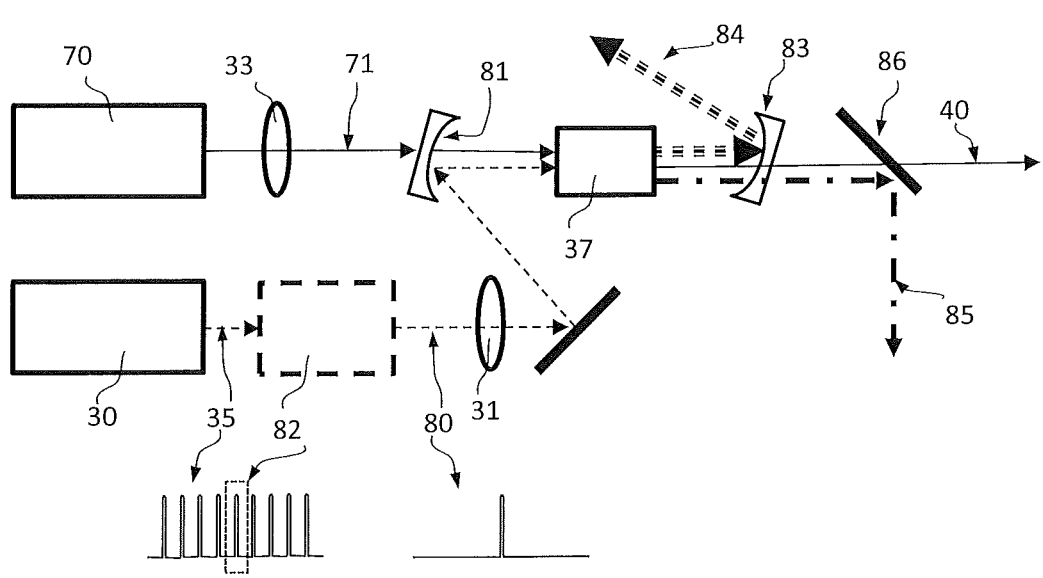
FIG. 8 provides an optical schematic of an embodiment of the invention.

The repetition rate of the pump pulses, is much smaller than the repetition rate in the pulse train from the master oscillator (e.g. 1 kHz vs 100 MHz respectively) therefore only a small fraction of the pulse train 35 is amplified and the gain in the average power is low when compared to CW pumping. As shown in FIG. 8, a pulse picker 82 may be used to select seed pulses 80 from the master oscillator pulse train 35 and synchronize them with the pump pulses 71 for amplification. The seed pulses and pump pulses are superimposed in the bulk GM-NM 37 with dichroic mirror 81. The spectrally broadened output 84 is separated from the amplifier output with dichroic mirror 83. In addition to amplified seed pulse output, the amplifier output may include an optical harmonic 85 (e.g. the frequency doubled second harmonic) that is separated from residual pump 40 with dichroic mirror 86. The seed pulse width may be, for example, between 1 fs and 10 ps.

The pulsed pump laser can be for example a mJ, ns, Q-switched bulk Er:YAG, Ho:YAG laser, or Ho:YLF laser. In at least one embodiment, the pump laser is a 2 mJ, 1 kHz Er:YAG laser at 1.65 µm. In at least one embodiment, the seed laser is a 80 MHz, Cr:ZnS laser with 20 nJ, fs pulses.

Figure 9:
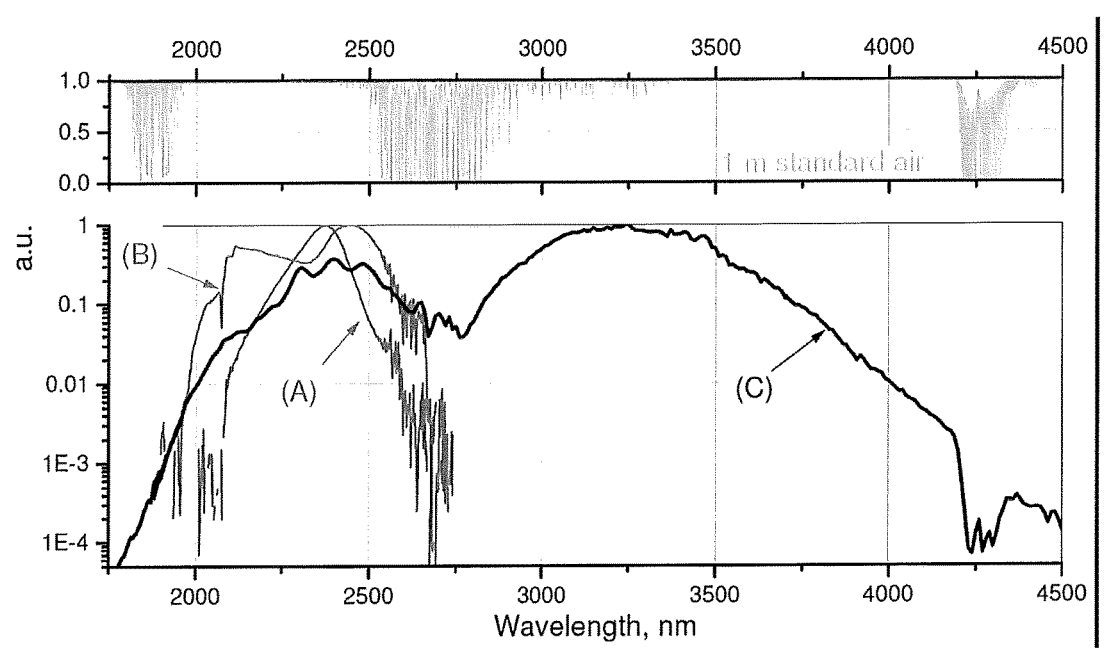
FIG. 9 provides measured spectra of output pulses an embodiment of the invention.

FIG. 9 illustrates experimental results. Curve (A) shows initial "cold" spectrum of pulses from the master oscillator, curve (B) shows spectral broadening in "hot" continuously pumped single-pass amplifier, curve (C) shows strong spectral broadening in pulse-pumped single-pass amplifier, essentially we generate the mid-IR supercontinuum from 1.8-4.5 um.

Figure 10:
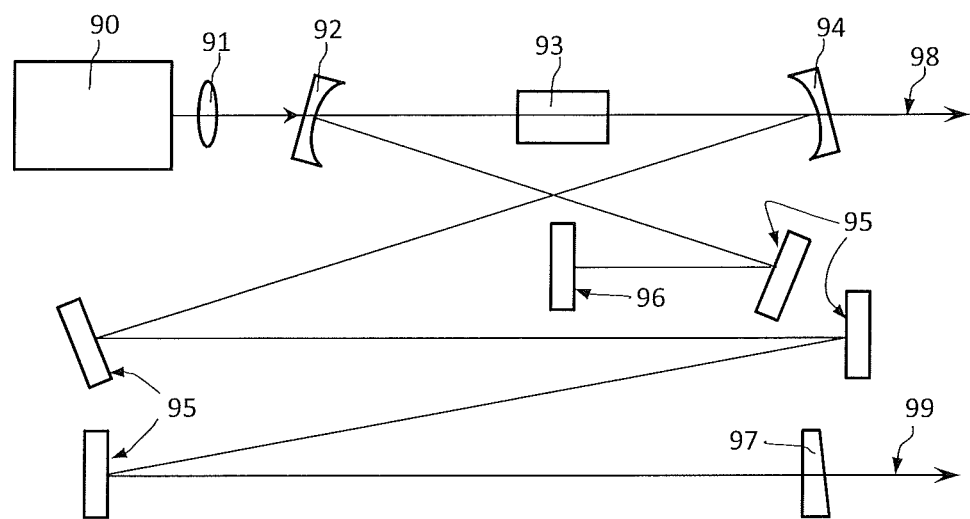
FIG. 10 provides a schematic of a master oscillator for use with the present invention.

An exemplary master oscillator for use in the present invention is shown in FIG. 10. The exemplary master oscillator is optically pumped at 1567 nm by Er— doped fiber laser (EDFL) 90, focused by lens 91. An AR coated polycrystalline Cr2+:ZnS gain element 93 is mounted in the resonator at normal incidence between two curved mirrors 92 and 94. In this example, the gain element is 5 mm long with 11% low-signal transmission and is cooled with room temperature water. The resonator's legs are unequal with a typical ratio of 2:5. The laser has two optical outputs: mid-IR 99 through the output coupler OC 97 and second harmonic generation SHG 98 through curved dichroic mirror 94 with high transmission in the SHG wavelength range. The reflectivity and the group delay dispersion (GDD) of the optical coatings were optimized in the 2200-2700 nm wavelength range. Net GDD of the resonator can be adjusted in discrete steps by changing a type and the number of installed high reflectors HR 95 with negative GDD. Third order dispersion (TOD) of the gain element was compensated by a dedicated mirror 96, HR*. The laser was optimized for maximum CW output power. The distance between the curved mirrors was then fine-adjusted in order to enable Kerr-Lens mode-locked regime (initiated by OC translation). Spectral and temporal parameters of the mode-locked laser were characterized using a 0.15 m dual grating monochromator and an interferometric autocorrelator. Distortions of the output pulses due to propagation through 3.2 mm thick ZnSe substrate of the OC (GDD=+710 fs2 at 2400 nm) were compensated outside the resonator by a combination of 5 mm thick YAG plate and TOD compensator HR*.

The laser system of the present invention can further benefit from additional optical components. In at least one embodiment, the laser system includes at least one dispersive element placed before or after the bulk material GM-NM. Such dispersive elements may include any one or a combination of a plane-parallel plate, or a set of dispersive prisms, or a dispersive mirror.

While a single stage of optical amplification preferred, multiple amplification stages following the master oscillator are within the scope of the present invention. For example, the master oscillator stage may be followed by a pre-amplification stage to increase pulse power prior to the main power amplifier for increased output power and increased spectral broadening. A system may have multiple pumped power amplification stages in serial or parallel configurations.

Generally, at least one amplification stage will be configured to spectrally broaden the output, however multiple stages may contribute to spectral broadening. The master oscillator may initiate spectral broadening with sufficient peak power to reach the critical power level followed by additional spectral broadening in the power amplifier stage. If there are multiple GM-NM stages, gain and broadening characteristics may vary between stages. System parameters including beam properties and pump characteristics may selectively enhance gain and broadening. For example, one portion of GN-NM volume may be optimized for gain while another is optimized for broadening.

Those skilled in the art will recognize or be able to ascertain using no more than routine experimentation many equivalents to the specific embodiments of the invention described herein. The disclosed schematics can be used with any laser system, but the impetus for the presently disclosed structure lies in spectral broadening. It is therefore to be understood that the foregoing embodiments are presented by way of example only and that within the scope of the appended claims and equivalents thereto, the invention may be practiced otherwise than as specifically described. The present disclosure is directed to each individual feature, system, material and/or method described herein. In addition, any combination of two or more such features, systems, materials and/or methods, if such features, systems, materials and/or methods are not mutually inconsistent, is included within the scope of the present invention.

The invention claimed is:

1. A short-pulse, single-pass, amplifier based laser system with a spectrally broadened laser output, the system comprising:
a seed laser; and
a pulse-pumped single-pass laser amplifier configured to emit an amplified, spectrally broadened laser output;
wherein the seed laser is configured to emit a train of ultrafast mid-IR seed pulses;
wherein the laser amplifier is configured to receive and amplify the energy of at least one seed pulse;
wherein the laser amplifier comprises a nonlinear optical medium characterized by a critical power for self focusing, and comprising TM:II-VI polycrystalline material; and
wherein the nonlinear optical medium is irradiated in the single-pass laser amplifier above the critical power for self-focusing, whereby the laser output is spectrally broadened.

2. The laser system as in claim 1, wherein the nonlinear optical medium has a combination of laser gain and nonlinear optical properties.

3. The system as in claim 1, further comprising a pulse picker disposed between the seed laser and the laser amplifier, the pulse picker configured to select at least one seed pulse that is synchronized with a pump pulse for amplification.

4. The laser system as in claim 1, wherein laser gain in the laser amplifier provides amplified pulse power; and wherein the amplified pulse power exceeds the critical power for self-focusing in the nonlinear medium.

5. The laser system as in claim 1, wherein at least one emitted seed laser pulse has a peak power that exceeds the critical power for self-focusing in the nonlinear medium.

6. The laser system as in claim 1, wherein the laser output frequency spectrum exceeds one full octave.

7. The laser system as in claim 1, wherein the laser output wavelength spectral range is 1.8 to 4.5 microns.

8. The system as in claim 1, further comprising a master oscillator emitting a pulsed fs output to seed the nonlinear optical medium concurrent with the optical pumping of the single-pass laser amplifier.

9. The system as in claim 8, wherein nonlinear interaction of seed pulses from the master oscillator in the nonlinear optical medium results in spectral broadening of the pulsed output.

10. The system as in claim 1, further comprising optics for superimposing and focusing pump pulses and seed laser emissions on the nonlinear optical medium.

11. The system as in claim 1, further comprising optics for separating spectrally broadened output pulses from residual pump pulses.

12. The system as in claim 1, wherein the peak power of at least one seed pulse exceeds the critical power ($P_c$) for self-focusing in the nonlinear optical medium.

13. The system as in claim 1, wherein the nonlinear optical medium is selected from the group consisting of Cr:ZnS, Cr:ZnSe, Cr:CdS, Fe:ZnSe and Fe:ZnS.

14. The system as in claim 1, wherein the pulsed-pumped single pass amplifier is energized by a pump selected from the group consisting of Er- doped fiber lasers, Tm- doped fiber lasers and TM:II-VI bulk medium lasers.

15. The system as in claim 14, wherein the pump laser is a mJ, ns, Q-switched bulk Er:YAG laser.

16. The system as in claim 1, wherein seed laser pulse width is between 1fs and 10 ps.

17. A method of enhancing the properties of a femtosecond laser pulse comprising; propagating a femtosecond seed pulse from a master oscillator into to a TM:II-VI polycrystalline material (GM-NM), wherein the seed pulse is characterized by a pulse energy and a spectral width, wherein the GM-NM is operable to increase peak pulse power and to broaden the spectrum of the seed pulse during in a single pass propagation; and concurrently pumping the GM-NM with an optical pump pulse, wherein the pump pulse energy is sufficient to produce a laser interaction between the seed pulse and the bulk medium, wherein the laser interaction and a least one nonlinear process enhances the properties of the femtosecond seed pulse such that an enhanced pulse with increased pulse energy and increased spectral width is emitted as an output pulse from the GM-NM.

18. The method of claim 17, wherein the spectrum of output pulses is broader than the spectrum of input pulses from the master oscillator.

19. The method of claim 17, wherein the temporal pulse width of output pulses is shorter the pulse width of input pulses from the master oscillator.

20. The method of claim 17, wherein the output energy of pulses is larger than the energy of input pulses from the master oscillator.

21. A short-pulse, single-pass amplifier based laser system for spectral pulse broadening, the system comprising:
a seed laser configured to emit a train of ultrafast mid-IR seed pulses;
a pump laser operable in selectable continuous pumping and pulsed pumping modes;
a single-pass laser amplifier; and
a nonlinear optical medium configured to spectrally broaden and amplify seed pulses in the laser amplifier;
wherein the continuous pumping mode provides high average power amplification of the seed pulse train;
wherein the pulsed pumping mode provides high peak power of the seed pulse train.

22. The system as in claim 21 wherein the nonlinear optical medium provides spectral pulse broadening without pump power.

23. A short-pulse, single-pass, amplifier based laser system with an amplified, spectrally broadened laser output, the system comprising:
a seed laser configured to emit a train of ultrafast mid-IR seed pulses, at least one seed pulse in the pulse train characterized by a central wavelength, a first pulse energy, and a first spectral width;

a pulse-pumped single-pass laser amplifier comprising a bulk medium, which comprises TM:II-VI polycrystalline material, and a pump pulse source, the pump pulse source configured to emit at least one pump pulse that is coincident with the at least one seed pulse, the bulk medium Characterized by a laser gain and at least one non-linear optical property, the laser gain property and the at least one non-linear optical property providing amplification and spectral broadening of the at least one seed pulse, and a laser output comprising at least one output pulse, the at least one output pulse characterized by a second pulse energy and a second spectral width, wherein the second pulse energy is greater than the first pulse energy and wherein the second spectral width is greater than the first spectral width, whereby the laser output comprises an amplified and spectrally broadened laser output laser output.

24. The system as in claim 23, wherein the second spectral width spans at least one octave.

25. The system as in claim 23, wherein the second spectral width is greater than the central wavelength of the at least one seed pulse.

26. The system as in claim 23, wherein the second spectral width spans at least from 1.8 microns to 4.5 microns.

27. The system as in claim 23, wherein the laser output further comprises amplified and temporally compressed seed pulses.

28. The system as in claim 23, wherein the second spectral width is responsive to pump pulse peak power such that an increase in pump pulse peak power corresponds to an increase in the second spectral width.

29. The system as in claim 23, wherein the nonlinear optical medium is selected from the group consisting of Cr:ZnS, Cr:ZnSe, Cr:CdS, Fe:ZnSe and Fe:ZnS.

* * * * *